United States Patent [19]

Lawyer

[11] 4,184,022
[45] Jan. 15, 1980

[54] POLYISOCYANURATE FOAM COMPRISING REACTION PRODUCT OF A POLYISOCYANATE AND A POLYOL MIXTURE COMPRISING A CARBOXYLIC ESTER POLYOL AND A RESOLE POLYETHER POLYOL USING A CATALYST COMPRISING DIMETHYLETHANOLAMINE AND AN ALKALI METAL SALT OF A CARBOXYLIC ACID

[75] Inventor: Russell R. Lawyer, Newark, Ohio

[73] Assignee: Owens-Corning Fiberglas Corporation, Toledo, Ohio

[21] Appl. No.: 942,662

[22] Filed: Sep. 15, 1978

[51] Int. Cl.$^2$ ............................................. C08G 18/14
[52] U.S. Cl. .................................. 521/118; 521/125; 521/173

[58] Field of Search ..................... 521/118, 125, 173

[56] References Cited
U.S. PATENT DOCUMENTS

| 3,180,846 | 4/1965 | Haggis | 260/31.2 |
|---|---|---|---|
| 3,516,950 | 6/1970 | Haggis | 521/125 |
| 3,531,415 | 9/1970 | Reymore et al. | 521/171 |
| 3,580,868 | 5/1971 | Diehr et al. | 260/18 TN |
| 3,581,826 | 6/1971 | Dougan et al. | 169/15 |
| 3,644,232 | 2/1972 | Bernard et al. | 260/570.8 R |
| 3,725,319 | 4/1973 | Frisch | 528/44 |
| 3,745,133 | 7/1973 | Comunale et al. | 521/125 |
| 3,770,671 | 11/1973 | McFarling | 521/175 |
| 3,876,568 | 4/1975 | Wysocki | 521/120 |
| 3,899,443 | 8/1975 | Reymore et al. | 521/125 |
| 3,940,517 | 2/1976 | DeLeon | 427/373 |

Primary Examiner—Maurice J. Welsh
Attorney, Agent, or Firm—Ronald C. Hudgens; Philip R. Cloutier; James B. Wilkens

[57] ABSTRACT

Rigid cellular urethane-modified polyisocyanurate foam products, a cocatalyst system and manufacturing methods are disclosed. The foams are the reaction product of polynuclear aromatic polyisocyanate material and polyol material with the polyisocyanate material being present in sufficient amount to provide isocyanurate groups as the major recurring polymer unit. The polyol comprises a mixture of diethylene glycol esters of biphenyl di and tri carboxylic acids and a resole-type polyether polyol. A catalytic amount of a binary catalyst comprising dimethyl ethanolamine and commercially available E9403 is incorporated in the reaction mixture along with a halocarbon blowing agent; a cell modifier; and a flame retardant material; to produce a cured foam having low flame spread rate and low smoke evolution.

14 Claims, No Drawings

POLYISOCYANURATE FOAM COMPRISING REACTION PRODUCT OF A POLYISOCYANATE AND A POLYOL MIXTURE COMPRISING A CARBOXYLIC ESTER POLYOL AND A RESOLE POLYETHER POLYOL USING A CATALYST COMPRISING DIMETHYLETHANOLAMINE AND AN ALKALI METAL SALT OF A CARBOXYLIC ACID

This invention relates to the preparation of polymer foams and is more particularly concerned with resole type polyols and polyester polyol combinations for modified polyisocyanurates and their utilization in the preparation of polyisocyanurate foams.

Rigid polyisocyanurate foams having high resistance to flame and heat as well as excellent thermal insulating capacity are known in the art. The prior art discloses methods for preparing such foams by reacting an organic polyisocyanate with a trimerizing catalyst in the presence of a blowing agent, and a minor proportion, usually less than 0.5 equivalent per equivalent of polyisocyanate, of a polyol; see for example U.S. Pat. Nos. 3,516,950, 3,620,986, 3,625,872, 3,725,319, 3,745,133, 3,876,586 and 3,899,443.

The known foaming processes proceed in conjunction with at least two polymer-foaming reactions; namely, the isocyanurate formation arising from the homopolymerization of the polyisocyanate employed, and the minor amount of polyurethane formation arising from the reaction of polyol with the isocyanate. Difficulties arise, particularly in commercial applications, due to the variation in relative rates of the two polymerization reactions. The polyurethane formation frequently initiates before the trimerization formation thus giving two separate rise steps in overall foam rise profile. Techniques for making rigid foams normally require that the polyisocyanurate foam-forming mixture be supplied in two or three streams to the mixing and dispersing head. By appropriate preblending of components, these streams can be brought together either in equal ratio by volume or with the polyisocyanate-containing component in excess.

Prior art methods for making polyisocyanurates have employed tertiary amines for trimerizing the isocyanates. In U.S. Pat. No. 3,899,443 amines are used in combination with organo-metallic compounds and alkali metal salts of N-substituted amides. It is recognized that certain alkanoic acid salts will react with NCO groups to form the corresponding amides.

A rigid cellular urethane-modified polyisocyanurate foam product has been found having low flame spread rate and low smoke evolution. This foam is the reaction product of polynuclear polyisocyanate material and polyol material. The preferred system comprises a biphenyl di and tri carboxylic acid ester of a low molecular weight alkanediol known as "Terate" available from Hercules Chemical Co. and a resole based polyether polyol as the polyol. The reaction mixture includes a cell modifier; a catalytic amount of a binary catalyst comprising dimethyl ethanolamine and Mobay's E9403; a halocarbon blowing agent; and a flame retardent material in the reaction mixture. Advantageously, the total polyol comprises about 10-20 weight percent of the foam product; the polyisocyanate comprises about 65-75% of the product; the flame retardent material comprises about 2-10% of the product; and the blowing agent comprises about 6-15% of the product. The binary cocatalyst system consists essentially of the tertiary amine and a commercially available isocyanurate catalyst in the total amount of about 0.5 to 1.5 wt %, with a reaction-promoting amount of water, usually 0.1 to 0.5% being employed advantageously to control the reaction profile of the system.

A preferred subclass of polymethylene polyphenylisocyanates especially useful in the present invention are a mixture of those components according to the following formula:

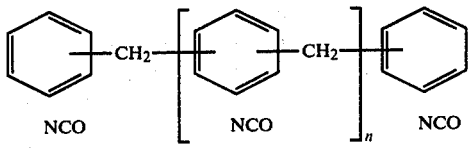

wherein n is an integer from 0 to 8 and wherein the mixture has the above-described functionality and equivalent weight. This mixture should have a viscosity between 100 and 4,000 and preferably 250 to 2500 centipoises measured at 25 C in order to be practical for use in the present invention.

The preferred polynuclear aromatic polyisocyanates are described along with their application to polyisocyanurate foams in U.S. Pat. No. 3,644,232, incorporated herein by reference.

The polyisocyanates employed in the preparation of polyisocyanurate foams in accordance with the present invention can be any of the polynuclear organic polyisocyanates conventionally employed in the art for this purpose previously.

Advantageously, in order to obtain foams having exceptionally high heat resistance and structural strength, the polyisocyanates employed in the process of the invention are polynuclear aromatic polyisocyanates, particularly those set forth in U.S. Pat. Nos. 3,745,133 and 3,940,517.

Various polynuclear aromatic polyisocyanates suitable for incorporation in the reaction mixture are commercially available; for instance those isocyanates sold under the names "Mondur MR" or "PAPI-580." A particularly preferred form of polyisocyanate is "Mondur" MR-200, a mixture of polymethylene polyphenylisocyanates.

Those isocyanates having a functionality of less than 2.1 are generally not acceptable because the resultant foams exhibit an undesirably high friability. Polymethylene polyphenylisocyanates having a functionality greater than 3.2 also produce foams of too great a friability. Therefore, the polyisocyanates of the present invention generally have a functionality of 2.1 to 3.2 and preferably 2.5 to 3.2

Polymethylene polyphenylisocyanates having an equivalent weight less than 120 tend to produce foams having too great a friability. Those having an equivalent weight greater than 180 are generally too viscous to make their use practical. Therefore, the preferred polymethylene polyphenylisocyanates employed in the present invention generally have an equivalent weight between 130 and 145.

The polyol reactants employed in this invention include two types of low molecular weight materials containing at least two reactive hydroxyl groups. Polyether- polyols and polyester-polyols are incorporated in the reaction mixture in a weight ratio of about 1:1 to 3:1, preferably about 1.7 to 2:1.

A suitable polyether-polyol may be prepared by oxpropylation of a base-catalyzed reaction product of phenol and formaldehyde, or low molecular weight analogs thereof, forming a resole-type polyol material. These resoles are formed by reacting, under basic conditions, phenol and formaldehyde in a ratio of about 2.4 to 2.8 moles of formaldehyde per mole of phenol, and further reacting this intermediate with an alkylene oxide. The preferred major polyol component is an oxypropylated resole-based polyol, as described in U.S. Pat. No. 3,770,671, incorporated herein by reference, this material is known commercially as "RE-300." The dominant polyol in this oxypropylated resole-based polyol has the following formula:

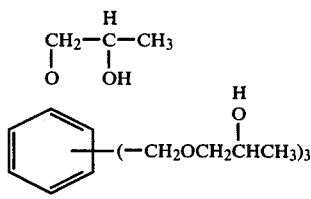

This major polyol component contributes to the observed thermal stability of the present modified isocyanurate foams.

The polyester-polyol component is usually present in minor amount in the polyol reactant portion. A preferred material is a diol obtained by transesterification of about two moles of diethylene glycol with the methyl esters of biphenyl di and tri carboxylic acids. A commercially available polyol known as "Terate," having a hydroxyl number of about 200 to 544, has been used in several formulations with good results. Certain suitable materials include aromatic polyester-polyols derived from polycarbomethyoxy-substituted diphenyls, polyphenyls and benzyl ester of the toluate type.

A portion of the total polyol material may contain other polyhydric compounds.

Certain aromatic or cyclic diacids may be reacted with lower epoxides to produce the polyester-polyols intermediates. Halogenated cyclic precursors may be reacted with polyols and epoxides to produce the corresponding polyols. In U.S. Pat. No. 3,531,415, certain halogenated polyester-polyols are disclosed having fire retardant properties in urethane foams. At least a portion of the polyester-polyol may comprise a derivative of chlorendic anhydride or acid. It has been previously believed that incorporation of halogenated polyols in modified-isocyanurate foams would increase smoke generation. However, the combination of significant amounts of the mixed o-,m- and p- phthlate diesters of lower alkanediols can provide dramatically-reduced smoke evolution.

The alkoxylated resole polyether-polyol will ordinarily comprise about 6 to 10 weight percent of the total foam product, and the aromatic polyester-polyol will comprise about 3 to 6% of the product. The total polyol material will have an average hydroxyl functionality of at least 2, preferably about 2.5 to 3.0. The typical modified isocyanurate foam will contain about 20 to 30 weight percent of total polyol.

Minor amounts of other polyols may be included, such as trimethylol propane, alkoxyalkanols glycols, etc., having 2 or more functional hydroxyl groups.

The polyol reactant material may include part or all of the blowing agent. This has been found to be a suitable technique for introducing a halogenated freon-type compound into the reaction mixture. Typical blowing agents include the chloro and fluoro-substituted C1-C2 alkanes, such as monofluorotrichloromethane (R-11-B). The total blowing agent in the reaction mixture may vary according to the desired foam product density. Typically, 5 to 15wt% blowing agent is required for commercially acceptable insulating foams. It is understood that the blowing agent may be introduced to the reaction mixture through another compatible stream, such as the isocyanate portion.

Foaming agents, surfactants, flame retardants, and the like, can be employed according to the teachings of the incorporated reference. A particularly preferred class of flame retardant additives are the phosphorous containing flame retardands, such as: tris(2-chloroethyl)phosphate, tris(2-chloropropyl-phosphate, tris 2,3-dibromopropyl)phosphate, tris(1,3-dichloroisopropyl)-phosphate, and the like.

Usually the flame retardant additive will comprise 2 to 10% of the reaction mixture; however, inclusion of halogenated materials in the other components permits a lesser amount of the phosphate-type additive. For instance, inclusion of a few percent chlorendic polyester-polyol would replace certain of the flame retardant additive.

The need to balance two different reactions, namely that leading to urethane and that leading to isocyanurate, in the preparation of polyisocyanurates makes the choice of catalyst particularly important. While the N,N-dimethylethanolamine/Mobay's E9403 combination described herein specifically requires the use of two different catalyst components in combination, it is to be understood that this does not exclude the presence in the catalyst combination of additional components or agents capable of causing the trimerization of a polyisocyanate provided the two essential components are present. Advantageously, the cocatalyst components are brought together during or immediately prior to the trimerization reaction of the polyisocyanate in the weight ratio of about 2:1 to 3:1 amine to E9403. The total amount of cocatalyst comprises about 0.5 to 1.5 wt% of the total reaction mixture. These proportions are important in obtaining the optimum reaction profile to assure that expansion of the foam is properly correlated with the curing of the polymer. While the urethane-forming reaction is relatively easy to catalyze, the trimerization reaction, which provides isocyanurate as the major recurring polymer unit, requires a careful balancing of the cocatalyst system.

It is understood that the reaction profile may be improved by incorporating a small amount of water in the reaction mixture, usually about 0.1 to 0.2 weight percent.

Advantageously, the co-catalytstic E9403 is kept separate from the isocyanate until blending the polyol and polyisocyanate components therewith. In the specification, metric units and parts by weight are employed, unless otherwise stated. The following examples are representative of the invention.

EXAMPLE I

A low flame, low smoke urethane-modified polyisocyanurate is made by combining the following reactant and other components.

The isocyanate is introduced as 69 parts by weight of "Mondur MR-200," a commercially available polynuclear polyisocyanate containing 4.85 parts fluorotrichloromethane and 0.3 parts silicone cell modifier (L5340). The polyol portion contains 8.68 parts of polyether-polyol (RE300, a resole-type oxypropylated phenol-formaldehyde product), 4.96 parts polyester-polyol (Terate 203, essentially a diethylene glycol di and tri ester of biphenyl di and tricarboxylic acid); 4.65 parts of flame retardant tris (chloroethyl phosphate); 0.43 parts dimethylethanolamine co-catalyst; 0.87 parts oxyalkylated siloxane cell modifier (DC-193); 0.19 parts water, and 6 parts fluorotrichloromethane. The additional co-catalytic component is introduced as a separate stream comprising 0.35 parts of E9403.

The master batch prepared by mixing the above components is contained under reaction conditions at ambient temperature until rigid and self-supporting. Curing overnight (10–20 hours) is adequate to provide a foam product having a density of 2.19 pounds/cu.ft. The average flame spread rating is 20.5 (ASTM E-84-75 test method, 10 minutes duration) and the smoke development value is 230.

The surface of the foam is somewhat friable on the surface, but, possesses good dimensional stability and insulation properties.

EXAMPLE II

The procedure of Example I is repeated except that the reaction mixture includes 9.0 parts by weight RE 300 polyol and 5.18 parts "Terate 204," similar to the polyester-polyol of example I, but with a lower percentage of diethylene glycol in the mixture. The mixture contains 4.47 parts fire retardant, 0.41 parts N,N-dimethylethanolamine, 0.35 parts E9403 and 0.83 parts of DC 193 surfactant (dimethyl silicone-polyethylene glycol copolymer). The blowing agent (10.56 parts) and 0.19 parts water are included in the polyol stream. The other reactant stream is 69 parts of "Mondur MR-200" polyisocyanate.

The reaction mixture is processed as a foam bun having a density of 2.20 pounds/ft$^3$. The standard ASTM tunnel test gave a flame spread of 25 with smoke density rating of about 250.

EXAMPLE III

In order to demonstrate the stability of those isocyanurate foams in the previous example, another foam is made by replacing the polyether-polyol/polyester-polyol reactants with other polyols. In this example a fraction (14.8 parts) of the polyol material is a diol derivative of 1,4,5,6,7,7-hexachloro-5-norbornene anhydride, obtained by reacting the anhydride with equimolar amounts of diethylene glycol, and further reacting the half-ester with propylene oxide. The remaining polyol (2 parts) is a commercially available novolak resin (DEN 431). The remaining components and catalysts are essentially the same as in example I. The resulting foam product has a density of 2.34 pounds/ft$^3$. While the smoke density value for the standard (ASTM-84) tunnel test is an acceptable value of 145; the flame spread of 38.5 is too high for an acceptable product.

The modified isocyanurate foams of this invention are useful for thermal insulation materials, prefabricated or reacted in situ. They may be formed as boards, buns, continous pipe, and/or composite structures. These are high performance cellular plastics having excellent fire retardant or low flame properties at reasonable cost. Modern chemical technology permits the development of such foams from available materials. In-line blending and appropriate dispensing equipment permits their use in systems which are projected by the mixing nozzle.

The cured foams of this invention may be fabricated into various shapes by cutting and bonded to other structural materials to form valuable laminates. Large buns of the foam may be cut into sheets and applied to plywood, particle board or the like with adhesive to provide flame resistant insulating products for building construction use. The foams made in accordance with the invention show good adhesion to a variety of substrates, including masonite, building board, gypsum board, asbestos board (transite), wood, plywood, sheet metal, and paper products such as Kraft paper and heavy cardboard. The cellular products of the invention can be employed for all the purposes for which the currently produced cellular foam products are conventionally employed and are particularly suitable for applications where thermal resistance, low flame spread and low smoke generation on combustion are required.

The cellular products of this invention can be employed as thermal barriers and insulating materials when applied to high temperature pipe lines, ovens, and storage tanks containing fluids at elevated temperatures, i.e., up to about 110 degrees centigrade. These foams also find use in cryogenic applications where insulation of pipes or tanks holding fluids at low temperatures require thermal insulation.

A process for in-line blending of three reactant streams from tanks containing fluent isocyanate, polyol and catalyst materials is described in U.S. Pat. No. 3,940,517, incorporated herein by reference. This process may be employed for making laminates having a core of the presently disclosed isocyanurate foams. The mixture of reactants can be cured on a moving conveyor or the like to provide a continuous sheet or web of desired thickness.

Advantageously, the method for manufacturing rigid urethane-modified isocyanurate foam product according to this invention comprises the steps of (a) admixing component streams to form a fluent reaction mixture thereof; (b) flowing the reaction mixture from the mixture step to a curing zone and (c) containing the reaction mixture until a rigid foam product is obtained. These component streams include (1) a first polyol-containing reactant stream comprising a major portion of resole-type polyether-polyol, a minor portion of diester of biphenyl di and tri carboxylic acids and lower alkanediol, and a catalyst component consisting essentially of N,N-dimethylethanolamine; (2) a second polyisocyanate reactant stream comprising a major portion of polynuclear aromatic polyisocyanate and; (3) a third stream comprising sufficient E9403 to constitute an effective cocatalyst when mixed with the amine catalyst of the first stream. At least one of streams 1 or 3 may contain a reaction-promoting amount of water, blowing agent, and cell modifier; and flame retardant material.

The three-component processing technique is particularly advantageous in controlling the relative reaction rates for continuous blending of the reaction streams. Variations in the isocyanate and/or polyol streams can alter the reaction profile markedly, and the capacity to change the co-catalyst ratio in response to such variations is considered a valuable operating factor.

As used herein the trade designation "Mobay's E9403" is used for convenience. Mobay's E9403 comprises potassium acetate dissolved in diethylene glycol and has been found to be effective in the combination disclosed. However, many other alkali metal salts of carboxylic acids are similarly effective.

While the invention has been described by specific examples, there is not intent to limit the inventive concept except as set forth in the following claims.

What is claimed is:

1. A rigid cellular urethane-modified polyisocyanurate foam product comprising the reaction product of polynuclear aromatic polyisocyanate material and polyol material; said polyol comprising a biphenyl di and tri carboxylic acid ester of a low molecular weight alkanediol and a resole-type polyether polyol; said polyisocyanate material being present in sufficient amount to provide isocyanurate groups as the major recurring polymer unit; a catalytic amount of a binary catalyst comprising dimethyl ethanolamine and an alkali metal salt of carboxylic acid; a halocarbon blowing agent; a cell modifier; and a flame retardant material; said foam having low flame spread rate and low smoke evolution.

2. The foam product of claim 1 wherein the total polyol comprises about 10–20 weight percent of the foam product; the polyisocyanate comprises about 65–75% of the product; the flame-retardant material comprises about 2–10% of the product; and the blowing agent comprises about 6–15% of the product.

3. The foam product of claim 2 having a density of about 2 pounds per cubic foot, a flame spread rate no greater than 25, and a smoke evolution value below 450, as determined by standard test method ASTM-84-75.

4. The foam product of claim 2 comprising tris(2-chloroethyl)phosphate flame retardant, fluorotrichloromethane blowing agent, and silicone-type cell modifier.

5. The foam product of claim 1 wherein said polyether-polyol consists essentially of a reaction product of oxypropylated resole-type phenol-formaldehyde, and wherein the polyester-polyol consists essentially of the diethylene glycol esters of mixed biphenyl di and tri carboxylic acids.

6. In a urethane-modified isocyanurate foam reaction mixture, the improvement which comprises: a cocatalyst system consisting essentially of about 2 to 3 parts by weight of N,N-dimethyl ethanol amine per part of an alkali metal salt of carboxylic acid.

7. A method for manufacturing rigid urethane-modified isocyanurate foam product comprising the steps of: admixing component streams to form a fluent reaction mixture thereof; flowing the reaction mixture from admixing step to a curing zone and containing said reaction mixture until a rigid foam product is obtained; said component streams comprising a first, polyol-containing reactant stream comprising a major portion of polyether-polyol, a minor portion of polyol ester of aromatic polyacid and alkanediol, and a catalyst component consisting essentially of dimethylethanolamine; a second, polyisocyanate reactant stream comprising a major portion of polynuclear aromatic polyisocyanate in sufficient amount to provide isocyanurate as the major recurring polymer unit; a third stream comprising sufficient alkali metal salt of carboxylic acid solution to constitute an effective co-catalyst when mixed with the amine catalyst of the first stream; at least one of said streams containing a reaction-promoting amount of water, blowing agent, and cell modifier; and flame retardant material.

8. The foam product of claim 1 wherein said catalyst contains a reaction-promoting amount of water.

9. The foam product of claim 8 wherein the amount of water is about 0.1 to 0.2 weight percent, based on the foam product.

10. The foam product of claim 1 wherein said polyol material has an average hydroxyl functionality of about 2.5 to 3, and wherein said binary catalyst consists essentially of about 2 to 3 parts of N,N dimethylethanolamine per part by weight of alkali metal salt of carboxylic acid.

11. The foam product of claim 10 wherein said polyisocyanate material has an average functionality of about 2.1 to 3.2.

12. The foam product of claim 1 wherein the binary catalyst comprises about 0.5 to 1.5 weight percent of the foam and N,N-dimethylethanolamine is present in a weight ratio of 2:1 to 3:1 based on alkali metal salt of carboxylic acid cocatalyst and wherein water is present in the amount of about 0.1 to 0.2 percent based on total foam.

13. In a rigid, thermally-insulating urethane-modified polyisocyanurate foam obtained by reacting sufficient polynuclear aromatic polyisocyante with a minor amount of polyol in the presence of a blowing agent to form a polymeric foam having isocyanurate as the dominant recurring polymer unit; the improvement which comprises:

a polyol reactant containing a major amount of alkoxylated resole-based phenol-formaldehyde type polyether-polyol and a minor amount of a polyester-polyol consisting essentially of the diethylene glycol ester of mixed bi phenyl di and tri carboxylic acids; and a water-promoted cocatalyst system consisting essentially of tertiary amine and an alkali metal salt of carboxylic acid.

14. The foam of claim 13 wherein polyol having an average OH functionality of about 2.5 to 3 comprises a total of 10 to 20 weight percent of the foam, wherein the polyether-polyol and polyester-polyol are present in a weight ratio of about 1.7:1 to 2:1, wherein dimethylethanolamine and an alkali metal salt of carboxylic acid are present in a weight ratio of about 2:1 to 3:1, with the co-catalyst comprising about 0.5 to 1.5 percent of the foam, and wherein water comprises about 0.1 to 0.5 percent of the foam.

* * * * *